(12) United States Patent
Patel

(10) Patent No.: US 8,602,196 B1
(45) Date of Patent: Dec. 10, 2013

(54) STAIR CLIMBING SYSTEM

(76) Inventor: Rakesh A. Patel, Carol Stream, IL (US)

( * ) Notice: Subject to any disclaimer, the term of this patent is extended or adjusted under 35 U.S.C. 154(b) by 322 days.

(21) Appl. No.: 12/801,879

(22) Filed: Jun. 28, 2010

(51) Int. Cl.
  *B65G 13/00* (2006.01)
  *B65G 13/11* (2006.01)
  *A61G 99/00* (2006.01)
  *A61G 7/10* (2006.01)

(52) U.S. Cl.
  USPC ............... 193/35 R; 52/184; 193/37

(58) Field of Classification Search
  USPC ..... 414/787, 800; 193/35 R, 37; 16/18 B, 29, 16/30, 31 R; 52/184
  See application file for complete search history.

(56) References Cited

U.S. PATENT DOCUMENTS

| | | | |
|---|---|---|---|
| 339,373 A | * | 4/1886 | Carroll .............................. 16/29 |
| 498,649 A | * | 5/1893 | Hallock ....................... 193/35 R |
| 995,300 A | * | 6/1911 | Sneed .............................. 83/708 |
| 4,024,600 A | * | 5/1977 | Feinberg et al. .............. 16/31 R |
| 5,664,379 A | * | 9/1997 | Kroll et al. ....................... 52/184 |
| 6,179,116 B1 | * | 1/2001 | Noniewicz et al. ........... 198/632 |
| 7,204,358 B2 | * | 4/2007 | Mueller ....................... 193/35 R |

OTHER PUBLICATIONS http://www.cheops-pyramide.ch/khufu-pyramid/sledge-tracks.html.*

* cited by examiner

*Primary Examiner* — Scott Lowe
(74) *Attorney, Agent, or Firm* — Dillis V. Allen, Esq.

(57) ABSTRACT

A stair climbing system for moving objects either up or down stairs that entails placing a base and roller assembly in a first position on the stairs, rolling the object over the stationary base and roller assembly, and then advancing the base and roller assembly from a trailing position under the object to an advanced position to continue movement of the object up or down stairs. The base and roller assembly base includes first and second side panels supporting a roller, each having surfaces reacting against the stair step and the stair riser to prevent tilting of the base and roller assembly under the load of the object.

4 Claims, 2 Drawing Sheets

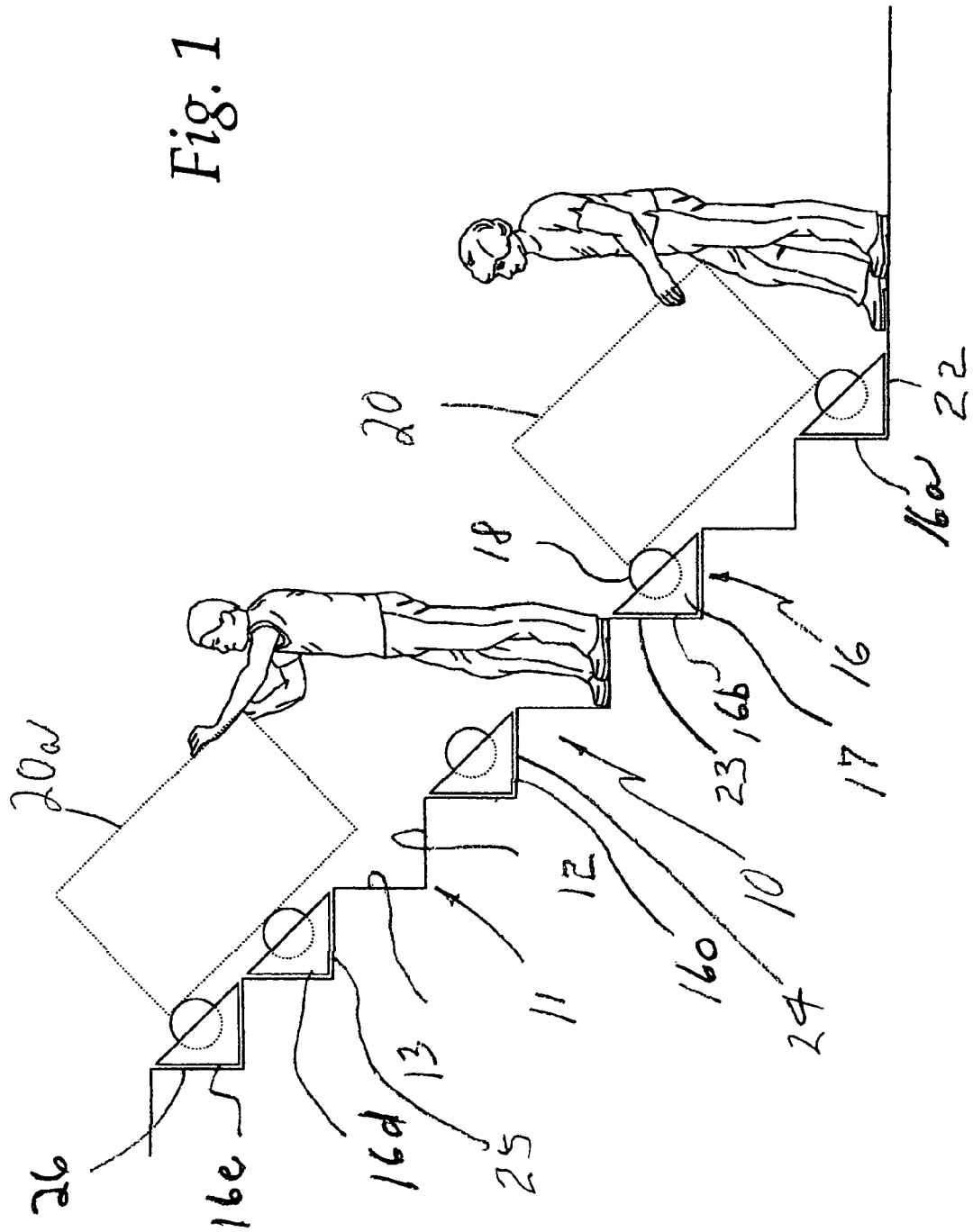

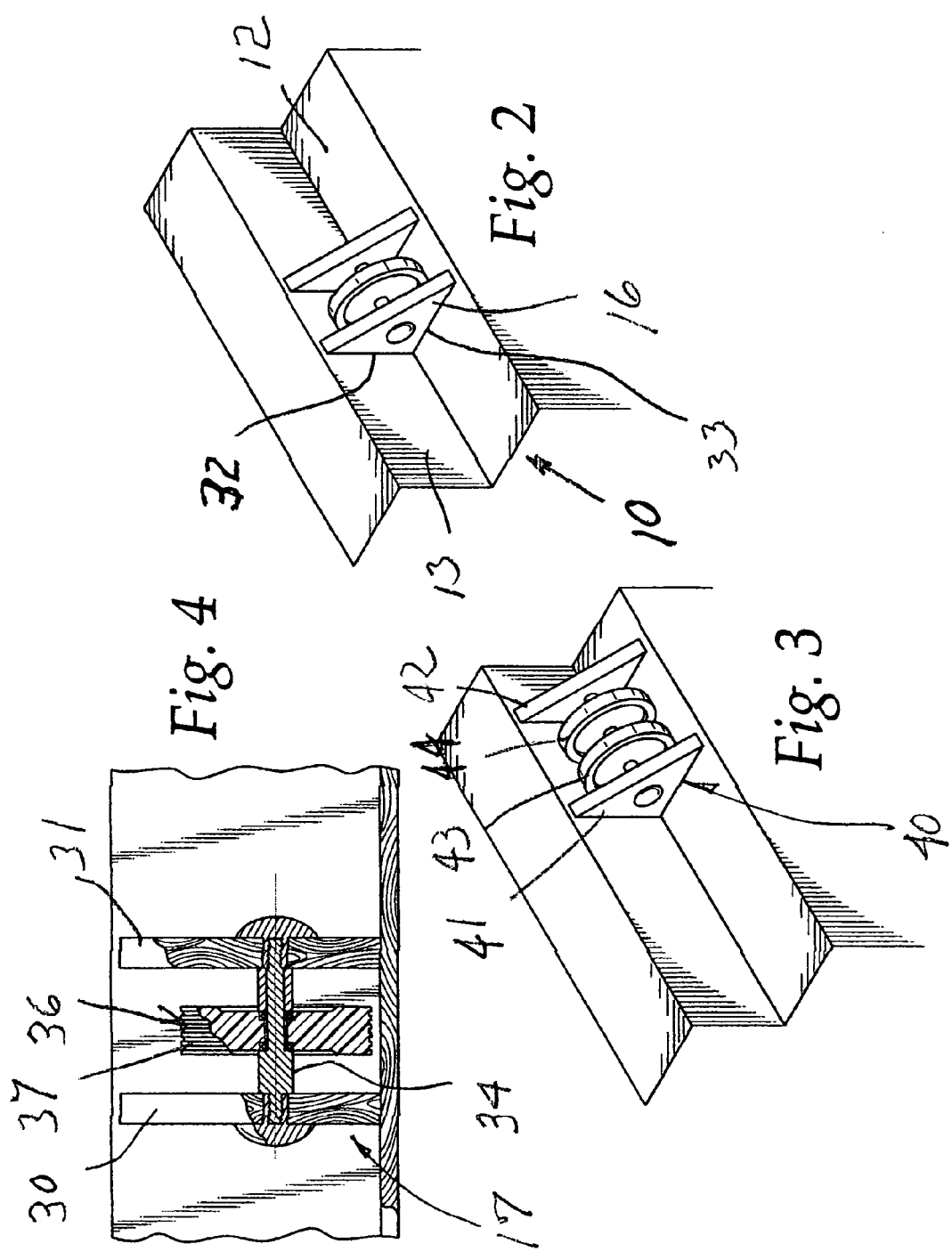

STAIR CLIMBING SYSTEM

BACKGROUND OF THE INVENTION

Systems for assisting in many objects up and down stairs have been devised, improved, digressed and modified for the last century. The majority of these systems involve a cart-like device that travels up and down the stairs. The present invention is the opposite of this concept.

The following patents with a short description of each are a result of a fairly complete and extensive patentability search completed on Sep. 8, 2008. No representation is made with respect to patents issued after that date nor is the exhaustive nature of the search represented to the examiner.

U.S. Pat. No. 2,990,929 discloses a wheel or roller used in a package conveyor.

U.S. Pat. No. 6,042,061 discloses a roller rung having a number of roller drums for a cable bed to draw and lay a cable (or pipe) on the cable bed.

U.S. Pat. No. 5,048,661 discloses a roller conveyor.

U.S. Pat. No. 2,325,762 discloses a boat leading attachment for automobiles that provides rollers to assist in loading a boat on position above a car.

U.S. Pat. Nos. 777,594, 617,968, 2,517,112, 1,411,044, 2,451,620, and 1,337,356 disclose a roller support for rolling and conveying a piece of wood.

U.S. Pat. No. 2,405,810 discloses a boat handling and launching apparatus that uses adjustable rollers to convey the boat.

U.S. Pat. No. 2,405,810 discloses dock rollers for boats to bring the boats from the water onto the dock.

U.S. Pat. No. 4,706,983 titled "Assembly for Towing a Boat" discloses a pair of channel members mounted on the transom of a boat.

U.S. Pat. No. 4,327,933 titled "Sailboat Carrier" discloses a single-wheeled dolly system that has a frame with clips which attach to the rungs of a ladder.

U.S. Pat. No. 3,575,439 titled "Load Conveying Cart" discloses a single wheel mounted in the center of an axle running the width of the attached cart.

U.S. Pat. No. 7,387,306 titled "Dolly" discloses a two-wheeled dolly with carrying frame with scoop.

Existing "load bearers" or "transport systems" consist primarily of dollies (U.S. Pat. No. 7,387,306), lifts, load carriers (U.S. Pat. Nos. 3,575,439, 4,327,933), stair tow systems. They are generally of the two wheeled or more varieties. Single-wheeled devices have been proposed for such purposes as carrying boats, ladders, and game animals (cart). Those devices used as boat carriers need to be used in pairs as they are attached to the boat or have cradles in which the boat is placed. However, a ladder caddy (U.S. Pat. No. 5,727,799) is a single-wheeled unit with a frame and clips that attach to the ladder rungs. Load conveying carts also use a single wheel that is mounted in the center of the axle which runs the full width of an accompanying cart.

The use of rollers to convey an item is well known in the art as shown by U.S. Pat. Nos. 2,405,810, 777,584, 617,968, 6,042,061 and 2,990,929. The U.S. Pat. Nos. 6,042,061 and 2,990,929 each disclose a roller in a frame. The rollers could be used to convey items up steps if the frames were different.

SUMMARY OF THE PRESENT INVENTION

In accordance with the present invention, a stair climbing system for moving objects either up or down is provided that entails placing a base and roller assembly in a first position on the stairs, rolling the object over the stationary base and roller assembly, and then advancing the base and roller assembly from a trailing position under the object to an advanced position to continue movement of the object up or down stairs. The base and roller assembly base includes first and second side panels supporting a roller, each having surfaces reacting against the stair step and the stair riser to prevent tilting of the base and roller assembly under the load of the object.

The system can be used with a single base and roller assembly, or two or four assemblies. One assembly can be used for small objects. Two assemblies can be used for objects that are not wide, but long, by placing a leading assembly under the forward end of the object and a trailing assembly under the rear end of the object. Four assemblies can be used by placing two assemblies at the leading end of the object on the same stair, and two assembles under the trailing end of the object on the same stair.

In some cases more than two sets of assemblies (a set being two assemblies on a single stair) may be utilized in cases where it becomes difficult to advance the trailing set of assemblies to the leading end of the object. Such a case may occur when the object is being moved up or down the stairs by a single mover. Thus theoretically, prior to object movement, sets of assemblies may be positioned all the way up the staircase and thereafter the object moved up or down the staircase without advancing any trailing roller assembly sets.

Other objects and advantages of the present invention will be seen more clearly in the following detailed description.

BRIEF DESCRIPTION OF THE DRAWINGS

FIG. 1 is a side view illustrating an operator and a mover in two positions rolling an object upstairs or down stairs utilizing the present stair climbing system;

FIG. 2 is a perspective view of one stair climbing assembly positioned centrally on a step;

FIG. 3 illustrates a second embodiment of the present invention utilizing two rollers, and;

FIG. 4 is a cross-section of the embodiment illustrated in FIG. 2.

DETAILED DESCRIPTION OF THE PREFERRED EMBODIMENTS

Referring to the drawings and particularly FIG. 1, a stair case 10 is illustrated having a plurality of stairs 11 each consisting of a step 12 and a riser 13. Five distinct stair climbing system roller assemblies 16 are illustrated in FIG. 1. Each of the roller assemblies 16 includes a base 17 rotatably supporting a roller 18.

In moving an object 20 up the staircase 10, the mover places a trailing end roller assembly 16a on step 22 and a forward roller assembly 16b on step 23 and rolls the object up the stairs to a position where the roller assembly 16b is the trailing roller assembly. At this point the mover moves the roller assembly 16a from step 22 and places it in the position of roller assembly 16c and continues moving the object up the stairs. When the roller assembly 16c is the trailing roller assembly, the mover moves the roller assembly 16c to the forward position illustrated at 16b on step 24. Continued movement of object 20 is indicated at 20a near the top of the stairs. An additional roller assembly may be positioned on step 26 as indicated by roller assembly 16e if desired.

Roller assembly 16 is illustrated placed centrally on the staircase 10 illustrated in FIG. 1. Viewing FIGS. 2 and 4, the base 17 includes a pair of parallel triangular side plates 30 and 31 having a rear vertical surface 32 engaging and reacting against riser 13 and a horizontal surface 33 engaging and reacting against step 12. Side plates 30 and 31 are connected together by a stepped axle 34 that rotatably supports a roller assembly 36 having a rubber thread 37 to prevent slipping of the object 20.

In a second embodiment of the stair climbing roller assembly 16 identified by the reference numeral 40 in FIG. 3, side plates 41 and 42 support two roller assemblies 43 and 44 to provide more stability for the object 20.

Alternatively, one may place two or more of the roller assemblies 16 in FIG. 2 on the same step to provide further lateral stability for the object 20.

The invention claimed is:

1. A stair climbing system for moving objects up or down stairs having steps and adjacent risers, comprising: a combined base and roller assembly including a base, said base having a first generally horizontal portion shaped to react against the step of one of the stairs and a second generally vertical portion shaped to react against the riser of the same stair, and a roller assembly mounted in the base and directly adjacent the base, said base and roller assembly being sized so they extend slightly above a line connecting the forward edges of the stair steps for rollably supporting the object to be moved up or down the stairs, whereby the base and roller may be advanced ahead of the object and be moved either up or down the stairs to be traversed.

2. A stair climbing system for moving objects up or down stairs having steps and adjacent risers as defined in claim 1, wherein the base includes a first side support having a first surface engageable with and reacting against the step of said one stair and a second surface engageable with and reacting against the riser of the same stair, and a second side support having a first surface engageable with and reacting against the step of said one stair and a second surface engageable with and reacting against the riser of the same stair, said roller assembly being mounted between and supported on the first and second side supports.

3. A stair climbing system for moving objects up or down stairs having steps and adjacent risers as defined in claim 1, wherein there is provided at least two base and roller assemblies, one being a leading base and roller assembly and the other being a trailing base and roller assembly, both engageable with the object at the same time so the trailing base and roller assembly may be advanced to the leading roller assembly as the object is moved up or down the stairs.

4. A method of moving an object up or down stairs having steps and adjacent risers with combined base and roller assemblies having a base with a first generally horizontal portion shaped to react against the step of one stair and a second generally vertical portion shaped to react against the riser of the same step with a roller assembly mounted on the base and directly adjacent the base, said base and roller assembly being sized so they extend slightly above a line connecting the forward edges of the stair steps including the steps of: placing the base and roller assembly on one step with the first portion reacting against the step of the one stair and with the base second portion reacting against the riser of said one stair, placing the object over the base and roller assembly with the object in engagement with the roller assembly to travel up or down the stairs, moving the object on the base and roller assembly up or down the stairs until the base and roller assembly can be removed from underneath the trailing end of the object, and replacing the base and roller assembly to a stair in advance of the object to continue moving the object up or down the stairs.

\* \* \* \* \*